Dec. 13, 1949   H. S. ALEXANDER   2,491,242
OPHTHALMIC TELEBINOCULAR WITH ORTHO TRAINER
Filed Oct. 16, 1948   4 Sheets-Sheet 1
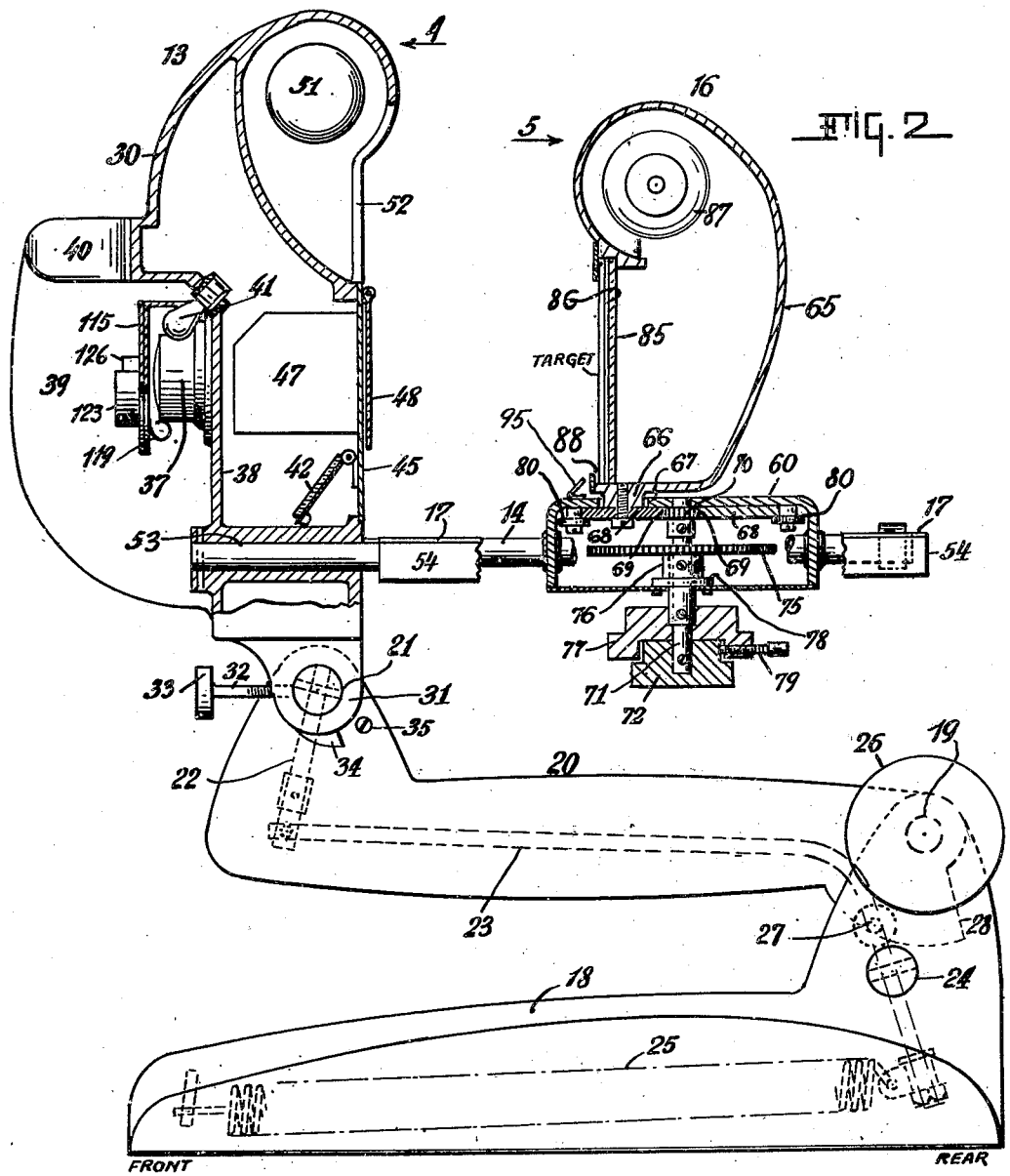

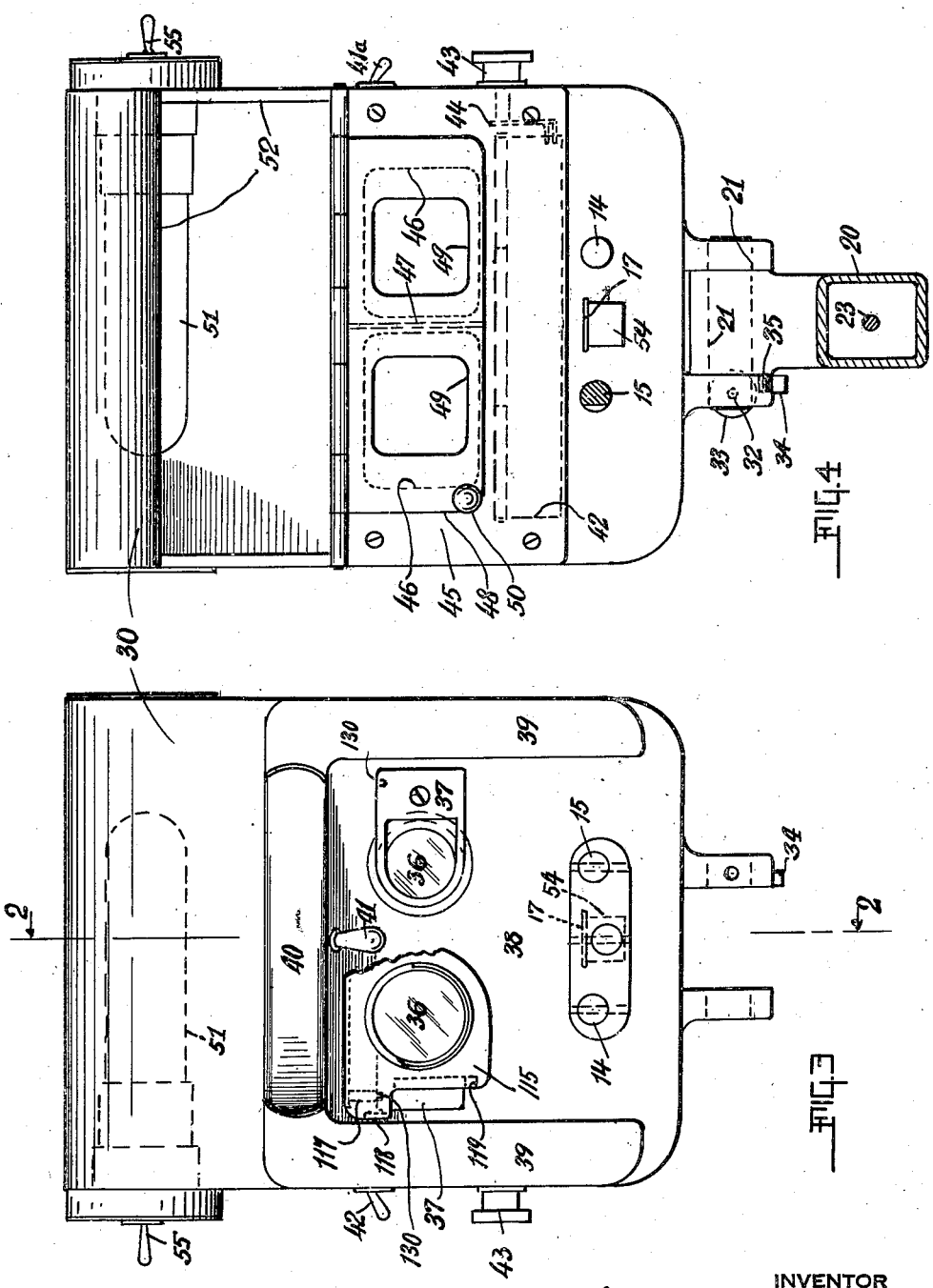

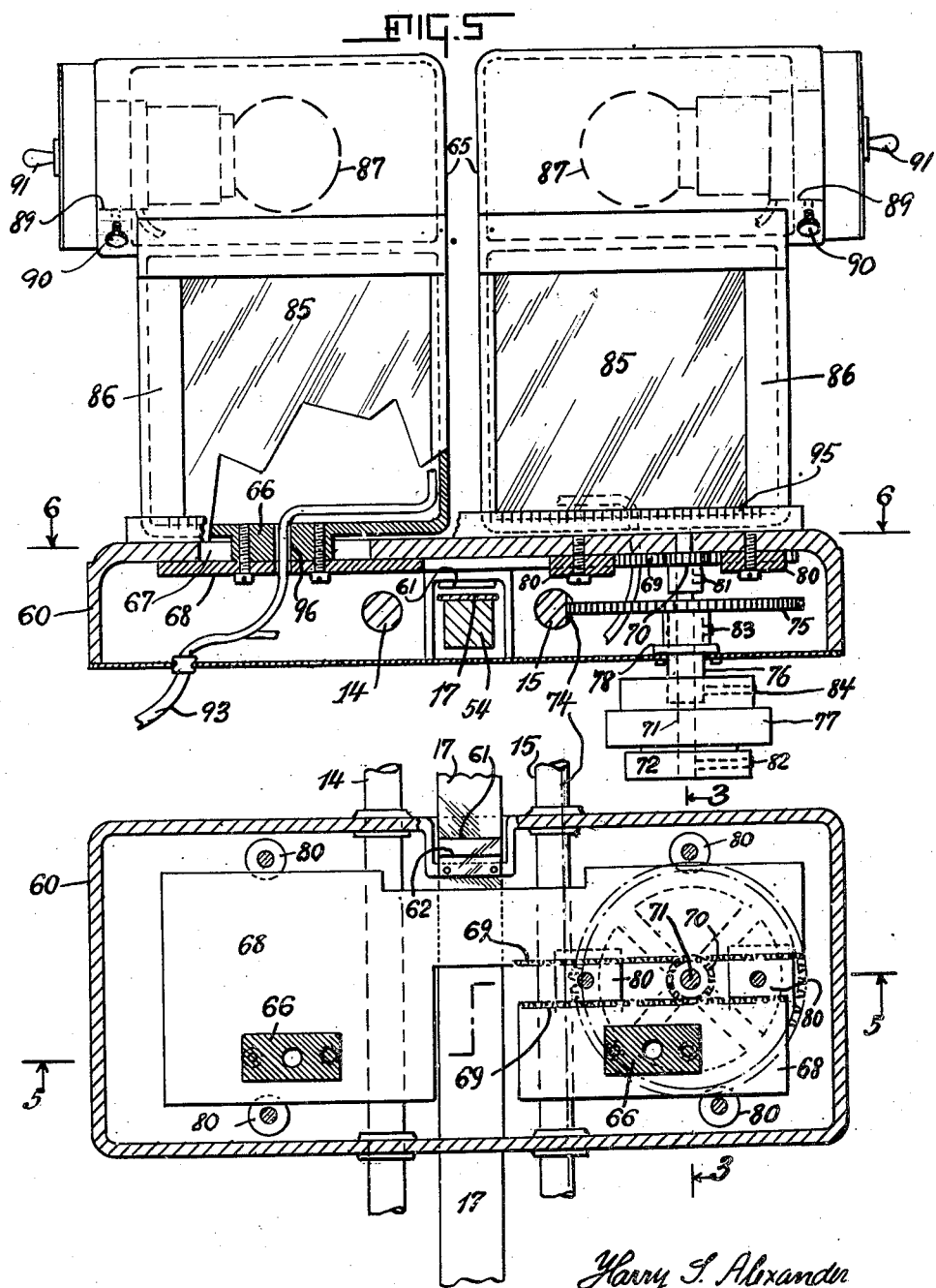

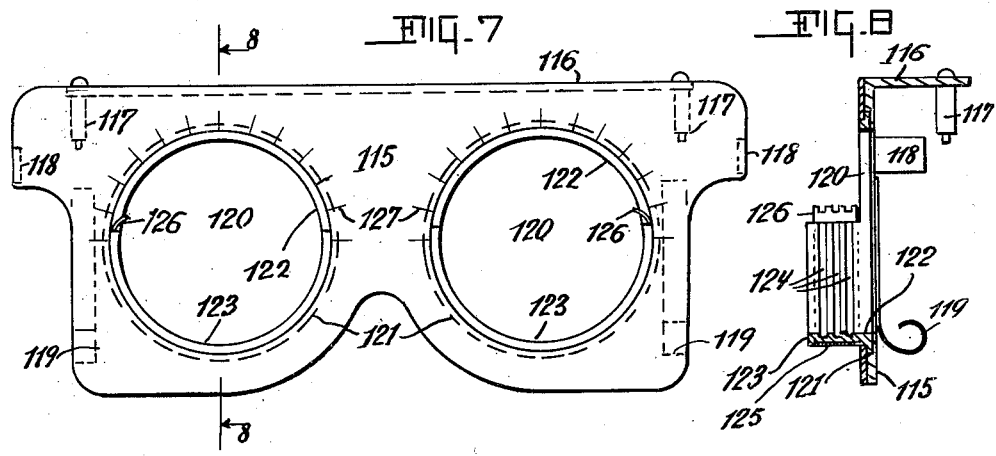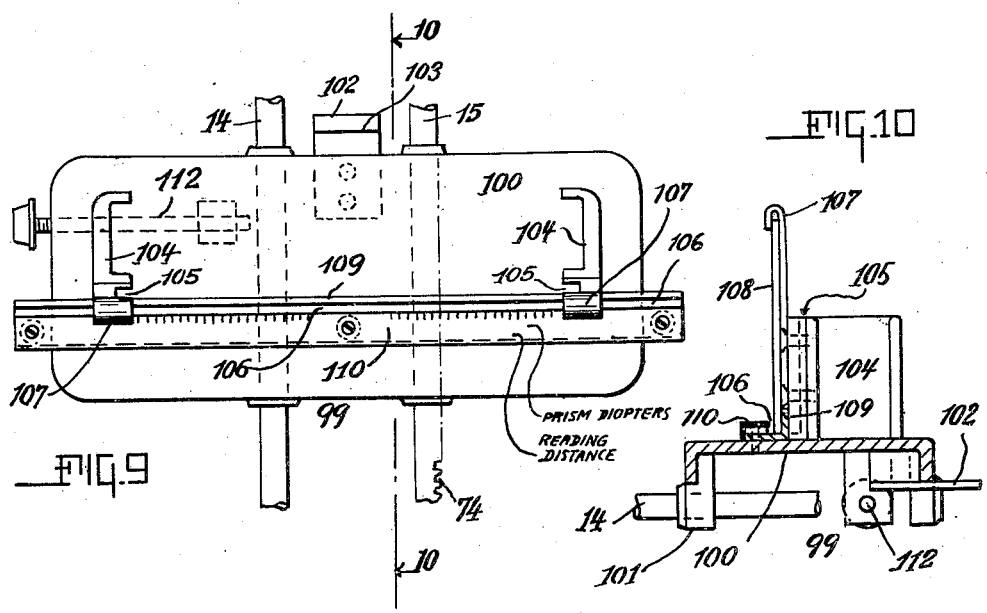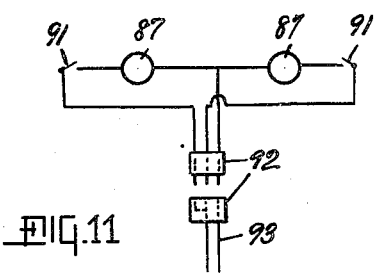

Patented Dec. 13, 1949

2,491,242

UNITED STATES PATENT OFFICE 2,491,242

OPHTHALMIC TELEBINOCULAR WITH ORTHO TRAINER

Harry S. Alexander, Meadville, Pa., assignor to Keystone View Company, Meadville, Pa., a corporation of Pennsylvania Application October 16, 1948, Serial No. 54,965

5 Claims. (Cl. 128—76.5)

The object of this invention is to provide a generally improved stereoscopic vision training and vision testing instrument embodying certain novel features of design, construction and operation whereby to provide a more efficient, accurate and convenient instrument for the use by ophthalmologists, their assistants and technicians, and other specialists in the art of training and testing visual abilities.

The invention is embodied in an instrument known as an ophthalmic telebinocular with ortho trainer. The instrument comprises an optical assembly head, an ortho trainer and a testing head. The optical assembly head is mounted on a supporting stand and carries two parallel shafts upon which either the ortho trainer or the testing head may be mounted in optical operative relation to the assembly head for vision training and vision testing purposes.

The ortho trainer is a device used mainly in training to maintain a constant normal relation between accommodation and convergence at all distances, or to give certain variants from this normal relationship as may be needed in special cases, and for other vision training purposes. The testing head is adapted to contain cards or targets used mainly for testing visual abilities. However, the uses of the ortho trainer and of the testing head overlap to some extent. Testing may be done with the ortho trainer and training may be done with the testing head.

The optical assembly with the ortho trainer, or with the testing head, forms an upper structure which is supported on the stand so as to be raised and lowered to suit the position of the subject undergoing a test. One of the objects of the invention is to provide an improved optical assembly head having a fixed optical lens system for viewing the cards or targets mounted either in the ortho trainer or in the testing head. The lens system includes means for supporting auxiliary lenses in adjusted position with reference to the eyes of the subject. Another feature is the provision of a lamp for illuminating the eyes of the subject for observation by the operator, either directly or by reflected light.

The ortho trainer is a device in the form of a split slide holder. It is adapted to contain transparent targets which are used when depth appreciation requires emphasis due to the character of the target, or to the correction requirements of the subject. For example, transparent targets are designed according to definite laws governing size constancy, that is, the size of the object of regard in each instance is appropriate for the position it occupies in the field and the distance to be considered in each instance. Transparent targets provide for the appropriate sequence according to instruction made during the tests. The transparent targets are illuminated by transmitted light. In other cases opaque targets or cards may be used. They are illuminated from the optical assembly head.

Another object is to provide novel means for operating the ortho trainer to provide for convergence and accommodation either jointly, or one without the other.

Other objects of the invention are to improve generally the construction of the instrument with respect to ease of operation, adjustment of various parts, changes from one type of target to another type, and ease in raising and lowering the rather heavy overhead structure, and the like.

With the above and other objects in view the invention is embodied in an ophthalmic telebinocular with ortho trainer as hereinafter described and as illustrated in the accompanying drawings in which Fig. 1 is a small diagrammatic view of the instrument seen from above.

Fig. 2 is a side view of the instrument with the optical head assembly in section on the line 2—2 of Fig. 3, and with the ortho trainer in section on the line 3—3 of Fig. 6.

Fig. 3 is a front view of the optical head assembly.

Fig. 4 is a rear view thereof looking in the direction of the arrow 4 in Fig. 2.

Fig. 5 is a front view of the ortho trainer looking in the direction of the arrow 5 in Fig. 2, and with parts in section on the line 5—5 of Fig. 6.

Fig. 6 is a horizontal sectional view of the ortho trainer on the line 6—6 of Fig. 5 and looking down upon the operating mechanism.

Fig. 7 is a front view of the auxiliary lens holder.

Fig. 8 is a sectional view thereof on the line 8—8 of Fig. 7.

Fig. 9 is a plan view of the testing head.

Fig. 10 is a sectional view thereof on the line 10—10 of Fig. 9.

Fig. 11 is a wiring diagram.

Fig. 1 is a small outline view of the instrument and shows a stand 12 for the support thereof. Above the stand is supported the optical assembly head 13 which carries two parallel shafts 14, 15 upon which the ortho trainer 16 is slidably supported so as to be moved longitudinally with respect to a lens system carried in the head 13 and with reference to a scale 17.

The stand, Fig. 2, comprises a hollow base 18 having a fixed pivot screw 19 upon which an arm 20 is pivoted so as to be raised and lowered with respect to the stand. The free end of the arm carries a rotatable short shaft 21 pinned to a crank 22. The lower end of the crank is pivotally connected to a dog leg link 23 which lies inside the hollow arm and extends downwardly into the base 18 wherein the link passes through and is pinned to a fixed pivot 24. A counterbalancing spring 25 is secured between the lower end of the link and the base, as shown. The spring is arranged to counterbalance the weight of the arm 20 and the upper structure of the instrument which are carried by the arm. The latter is frictionally held in the base upon the screw 19 which may be tightened by a hand knob 26 so as to clamp the arm closer to the base. The arm 20 has an integral quadrant 28 within the base. When the arm is raised above the base it may be locked in any raised position by a clamping screw 27 which engages the quadrant.

When the arm 20 is raised, the shaft 21 is rotated counterclockwise by the combined action of the crank 22 and the link 23. When the arm is lowered the shaft 21 is rotated clockwise by the same elements. The arrangement is such that irrespective of the vertical movements of the arm and the parts carried thereby, the parts will at all times be maintained in their angular positions relative to the base. For example, Fig. 2 shows the arm raised above the base. If the arm is raised or lowered from the position shown the head assembly 13 and the ortho trainer 16 will maintain their relative positions with respect to the base as these positions are shown.

The optical head assembly is contained within a housing 30 which is carried by the aforesaid shaft 21 by means of two pivot lugs 31 underneath the housing. The shaft passes through the arm 20 and the lugs 31. A screw 32 with a hand knob 33 is screwed through one of the lugs and into the shaft to lock the head assembly to the shaft 21 in any desired position.

Usually the head assembly will be locked to the arm in a position in which the shafts 14 and 15 are horizontal in any elevation, but some operators prefer to tilt the head assembly because they consider that the most usual position of the human head is slightly bent forward. One of the pivot lugs 31 has a stop lug 34 adapted to engage a stop screw 35 on the arm 20 so positioned that when the arm is raised to its upper position and the lug 34 is against the screw 35, the shafts 14 and 15 will be in their horizontal position ready to be locked into place by tightening the screw 32.

The housing 30 supports a fixed optical lens system consisting of a pair of lenses 36, 36 corrected for color and spherical aberration and arranged so that infinity is approximately 200 millimeters' distance from the lenses and the reading distance is about 131 millimeters. The lenses form a fixed optical system requiring no interpupillary adjustment. The lenses are carried in removable lens holders 37 screwed to the front wall 38 of the housing. The latter also forms forwardly extending side cheeks 39 to exclude side lights from the eyes of the subject. The latter rests his head against a head rest 40 above the lenses, and between the lenses there is mounted a small electric lamp 41 for illuminating the eyes of the subject. The lamp is controlled by a switch 41a, Fig. 4.

The operator will usually take a position in which he can look directly into the eyes of the patient over the ortho trainer to observe the movements of the eyes during the test or training exercise. Or the operator may find it more convenient to observe the eyes of the patient by reflected light and will then lift a pivoted mirror 42 by means of a knob 43 on the left side of the housing, Fig. 4, so that the light of the lamp will strike the mirror which will then reflect the eyes of the patient. The knob 43 is connected to the mirror by a crank 44.

The housing is open in the rear wall and carries a fixed shield 45 having two large openings 46 alined with the lenses for framing the targets for near viewing. The shield is provided with a septum 47. Adjacent the fixed shield there is pivoted a movable shield 48 having two smaller openings 49 for framing the targets for far viewing. The shield 48 may be lifted out of the way by a knob 50. The housing is open as at 52 to permit the light from the overhead lamp 51 to illuminate the targets. The shafts 14 and 15 are secured in the housing 30 as shown at 53, Fig. 2. The scale 17 is mounted on a scale support 54 fixed to the housing, Fig. 3. The lamp 51 is controlled by a switch 55.

The ortho trainer, Figs. 2, 5 and 6, comprises a base 60 on which two split slide holders 65 are mounted for relative transverse movement. The shafts 14 and 15, and the scale support 54 with the scale 17 pass through the base 60. The latter carries a glass plate 61 with a scale mark 62 for registry with the scale 17. The latter is in known manner calibrated in diopters for far point and near point viewing. The calibrations are not shown in detail but indicated at 63, Fig. 1.

The two split slide holders are alike except that one is right hand and the other left hand. Each holder consists of a housing 65 formed at the bottom with a foot 66 which extends downward through an opening 67 in the base, see Fig. 5. Within the base there is screwed upwardly against the foot a rack plate 68, one for each slide holder. Each rack plate is provided with a rack 69 and is held upward against the underside of the base in sliding engagement with suitable supporting members 80 upon which the rack plates slide and rest.

The racks 69 are engaged by a pinion 70 secured to a vertical shaft 71 by a set screw 81. The shaft extends below the base 60 and to its lower end is secured a knob 72 by a set screw 82. When the knob is rotated by the operator the pinion 70 causes the rack plates with the slide holders thereon to move towards and away from each other, respectively, depending upon the direction of rotation of the shaft. This movement (convergence) may be executed at any point or position of the ortho trainer relative to the lens assembly.

The slide holders may be operated longitudinally towards and away from the lens assembly (accommodation) by means of a large gear 75 which engages a rack 74 on the shaft 15, Fig. 5. The gear is secured to a sleeve 76 by a set screw 83. The sleeve extends through a bearing plate 78 and to the lower end of the sleeve is secured another knob 77 by a set screw 84. When the knob 77 is rotated, the gear 75 engages the rack 74 and the entire ortho trainer is then moved longitudinally upon the shafts 14 and 15.

The two knobs 72 and 77 may be locked together by a screw 79 and when thus locked and rotated the ortho trainer will be operated for combined convergence and accommodation movements. The longitudinal movement may be stopped at any time, the screw 79 loosened to disengage the knobs, and then the knob 72 rotated separately to operate the pinion 70.

The housing 65 supports a ground glass 85 held in place by a glass holder 86. Light from an overhead lamp 87 is reflected from the inside of the housing towards the ground glass to illuminate transparent slides, not shown, inserted in the grooves 88, Fig. 2. The inside of the housing 65 will preferably be suitably coated to reflect the light from the lamp. The lamp sockets 89 are rotatably held in the housing by thumb screws 90 so that the illumination for each slide holder may be adjusted.

Each lamp 87 is separately controlled by its switch 91 and the wiring diagram in Fig. 11 shows the wiring from the three wire push plugs 92, 92 to the lamp via the switches. The incoming supply wires are marked 93. When opaque targets, not shown, are placed in the grooves 88, the lamps 87 are extinguished, and the slides then illuminated from the lamp 51 in the optical head assembly. The convergence movements of the split slide targets in the slide holders are in known manner measured and read against a transverse scale 95 marked for near point and far point reading. The wires to the lamps pass through openings 96 in the feet 66 of the housings as shown on the left hand side of Fig. 5 so as to follow the transverse movements of the slide holders.

The vision testing head 99 is shown in Figs. 9 and 10. When it is to be used, the ortho trainer is removed from the shafts 14 and 15, and the testing head placed upon the shafts. The head comprises a base 100 with bearings 101 for mounting upon the shafts 14 and 15. The base carries at the rear a transparent plate 102 having a mark 103 for registry with the longitudinal scale 17. A card magazine 104 is mounted on top of the base 100 and is adapted to contain the testing cards, not shown.

The magazine is formed with side grooves 105 in which a single card is placed for testing exercises. If the operator desires to use split cards for testing purposes, such as are designed for use with the ortho trainer, the two halves of such split card are placed in a groove 106 and held in position by upright hooked members 107. A split card 108 is shown in Fig. 10. The groove 106 is formed between a flange 109 and a scale 110 secured to the base. The graduations on the scale are marked in diopters for infinity and near point reading, as indicated. Other training cards may be placed directly in the front of the magazine and the distance between such cards and the lenses are set to requirements of the case and not to standard measurements. The testing head is moved by hand on the shafts 14 and 15. It may be fixed in any longitudinal position by a screw 112 which is brought to bear against the shaft 14.

If the condition of the eyes of the subject requires the use of additional lenses to be placed in front of the fixed lenses 36, an auxiliary lens holder is used, Figs. 7 and 8. The holder consists of a flat support 115 having an overhanging flange 116 with positioning pins 117, side guides 118 and springs 119. The support has lens openings 120 provided with circular grooves 121 in which are rotatably mounted lens frames 122 formed with forwardly projecting lens cups 123 of semicircular form. The lens cups have grooves 124 into which auxiliary circular lenses, not shown, may be inserted and held in position by springs 125.

The latter have protruding ends or prongs 126 which engage the circumference of the lens in the cup 123. The support 115 is provided with circular scales 127 for each lens opening. The scales read in degrees not shown.

The auxiliary lens support may be placed in operative position in over and in front of the permanent lens holders 37, Figs. 2 and 3, and then pushed inwardly so that the pins 117 snap into sockets 130 in the holders 37 and the springs 119 engage the underside of the latter. The side guides 118 serve to guide the attachment into place. Then the rotatable lens frames may be rotated to position the axis of an auxiliary lens in the proper angular position with reference to the subject.

From the foregoing description and the drawings it will be seen that the invention provides an instrument including many advantageous features whereby the ophthalmologist and other specialists in the art of training and testing visual abilities may conduct many different kinds and types of test and training exercises. The balanced construction of the base makes it easy to raise and lower the upper structure to suit the convenience of the subject. The ortho trainer is a convenient and practical instrumentality for using both opaque and transparent targets. When transparent targets are used either one may be illuminated separately. The arrangement of the two knobs 72 and 77 underneath the ortho trainer is convenient and practical for the operator in switching from accommodation to convergence tests, or vice versa, or for executing these movements jointly.

The card testing head provides support for split slides, or straight flat slides which are placed in the grooves. Some types of cards are curved in the make up and they may be used directly in the magazine. Some details known to the art such as near and far point stops on the longitudinal shafts are not shown. Neither has it been thought necessary to illustrate the calibrations of the scales. The longitudinal scale is for measuring the reading distance from the lens system. The transverse scales are calibrated for far point and near point. They are used to identify positions of split slides when checking the improvement of the subject through a training series of targets or cards.

I claim:

1. An instrument of the character described comprising an optical lens system, a housing supporting the same, a pair of parallel shafts extending from said housing in the viewing direction, an ortho trainer unit movably carried by said shafts and comprising a base, a pair of target housings movably supported on the base, a transparent target in each of said target housings, a lamp in each housing for illuminating the target therein, a toothed rack on one of said shafts and a gear in the base of said unit engaging said rack for moving said ortho trainer unit along the shafts in optically viewable relation to the said lens system and a knob for operating said gear.

2. An instrument according to claim 1 including a gearing mechanism carried by the said ortho trainer base and operatively connected to the said toothed rack and to the said movable target housings for moving said ortho trainer unit along the said shafts and simultaneously therewith moving said target housings towards and away from each other transversely of the viewing direction in optically viewable relation to the said lens system and means for operating the said gearing mechanism.

3. An instrument of the character described comprising an optical lens system, a housing supporting the same, a pair of parallel shafts extending from said housing in the viewing direction, an ortho trainer unit movably carried by the said shafts and comprising a base, a pair of target housings movably supported on the base, a transparent target in each of said target housings, a toothed rack on one of said shafts, a gearing mechanism in said ortho trainer base and operatively connected to the said toothed rack and to the said movable target housings for automatically moving the latter towards and away from each other transversely of the viewing direction simultaneous with lengthwise movement of the ortho trainer unit on said shafts, and for moving the said target housings transversely toward and away from each other at will independent of any lengthwise movement of said unit, two rotatable knobs connected to said gearing mechanism for operating the same to cause either of the aforesaid movements, transverse and lengthwise, independently of each other and means for connecting said knobs to cause simultaneous transverse and lengthwise movements as aforesaid.

4. An instrument of the character described comprising an optical lens system, a housing supporting the same, a pair of parallel shafts extending from said housing along the viewing direction, an ortho trainer unit movably carried by the shafts and comprising a base, a pair of target housings movably supported on said base, a target in each of said housings, a toothed rack on one of said shafts, a gearing mechanism operatively connected to said rack and to the said target housings for moving the latter lengthwise on the shafts or for moving said housings towards and away from each other transversely of the viewing direction independent of any lengthwise movement, or for moving said housings lengthwise on the shafts and simultaneously therewith moving the housings transversely as aforesaid, a knob for actuating said gearing mechanism to cause said lengthwise movement only, a second knob for actuating the gearing mechanism to cause said transverse movement only and means for connecting said knobs to actuate the gearing mechanism to cause simultaneous lengthwise and transverse movements as aforesaid.

5. In an instrument of the character described, an optical lens system for viewing vision training and vision testing targets, removable lens holders supporting the lenses in said lens system, an auxiliary lens holder support, means in the latter for supporting auxiliary lenses therein and means for removably attaching said auxiliary lens holder support to the said removable lens holders with auxiliary lenses in operative optical relation to said system said removable attaching means comprising sockets in said removable lens holders, pins in said auxiliary support adapted to engage said sockets and springs on said auxiliary support adapted to engage underneath said removable lens holders.

HARRY S. ALEXANDER.

REFERENCES CITED

The following references are of record in the file of this patent:

UNITED STATES PATENTS

| Number | Name | Date |
|---|---|---|
| 2,091,173 | Wottring | Aug. 24, 1937 |
| 2,166,063 | Krimsky | July 11, 1939 |